US010685316B2

(12) United States Patent
Jo et al.

(10) Patent No.: US 10,685,316 B2
(45) Date of Patent: Jun. 16, 2020

(54) SIMPLE AND EASY METHOD FOR SECURELY OUTPUTTING ELECTRONIC DELIVERY WAYBILL, AND RECORDING MEDIUM

(71) Applicant: K CLOUD CO., LTD., Seoul (KR)

(72) Inventors: Nam Seob Jo, Seoul (KR); Chan Heui Park, Seoul (KR); Han Joo Kim, Yongin-si (KR); Kwang Su Woo, Namyangju-si (KR)

(73) Assignee: K CLOUD CO., LTD., Seoul (KR)

( * ) Notice: Subject to any disclaimer, the term of this patent is extended or adjusted under 35 U.S.C. 154(b) by 236 days.

(21) Appl. No.: 15/757,439

(22) PCT Filed: Sep. 2, 2016

(86) PCT No.: PCT/KR2016/009824
§ 371 (c)(1),
(2) Date: Mar. 5, 2018

(87) PCT Pub. No.: WO2017/043810
PCT Pub. Date: Mar. 16, 2017

(65) Prior Publication Data
US 2018/0253689 A1   Sep. 6, 2018

(30) Foreign Application Priority Data
Sep. 11, 2015  (KR) .................. 10-2015-0129099

(51) Int. Cl.
*G06Q 10/08* (2012.01)
*G06Q 50/28* (2012.01)
*G06Q 30/06* (2012.01)

(52) U.S. Cl.
CPC .......... *G06Q 10/083* (2013.01); *G06Q 10/08* (2013.01); *G06Q 10/0838* (2013.01);
(Continued)

(58) Field of Classification Search
None
See application file for complete search history.

(56) References Cited

U.S. PATENT DOCUMENTS 8,170,929 B1 *   5/2012   Mallon .................. G06Q 30/06
                                                      705/1.1
10,387,981 B2 *  8/2019   Jo ......................... G06Q 10/087
(Continued)

FOREIGN PATENT DOCUMENTS

JP         2010-140217 A       6/2010
KR         10-0875520 B1      12/2008
(Continued)

OTHER PUBLICATIONS

Merriam-Webster's Collegiate Dictionary, Tenth Edition, Merriam-Webster, Springfield, Massachusetts, U.S.A., 1997, p. 1337. (Year: 1997).*

(Continued)

*Primary Examiner* — Nicholas D Rosen
(74) *Attorney, Agent, or Firm* — Rabin & Berdo, P.C.

(57) ABSTRACT

The present invention relates to a method wherein a primary product supplier for an online shopping mall registers subordinate product suppliers with a system at the same level as the primary product supplier, and all the subordinate product suppliers access a secure delivery waybill agent system using an account assigned to the primary product supplier from the online shopping mall, regardless of the degrees thereof, so as to use a simple and easy system for securely outputting an electronic delivery waybill, so that the details of orders for several shopping malls can be output at one time, and the subordinates product suppliers in all the degrees can very conveniently print a delivery waybill without storing the personal information of the consignee.

10 Claims, 3 Drawing Sheets

(52) U.S. Cl.
CPC ......... *G06Q 30/06* (2013.01); *G06Q 30/0601* (2013.01); *G06Q 30/0635* (2013.01); *G06Q 50/28* (2013.01)

(56) References Cited

U.S. PATENT DOCUMENTS

| | | | | |
|---|---|---|---|---|
| 2013/0024393 | A1* | 1/2013 | Fleur | G06Q 10/083 |
| | | | | 705/333 |
| 2016/0328763 | A1* | 11/2016 | Jo | G06Q 10/08 |
| 2018/0309732 | A1* | 10/2018 | Jo | G06F 3/1238 |
| 2019/0180232 | A1* | 6/2019 | Jo | G06Q 50/28 |
| 2019/0220942 | A1* | 7/2019 | Jo | G06Q 30/0615 |

FOREIGN PATENT DOCUMENTS

| | | | |
|---|---|---|---|
| KR | 10-2012-0138499 A | 12/2012 | |
| KR | 10-2013-0029311 A | 3/2013 | |
| KR | 10-1533953 B1 | 7/2015 | |
| WO | WO-2010002053 A1 * | 1/2010 | ......... G06Q 30/0603 |

OTHER PUBLICATIONS

Pignataro, T.J., "Delivery Options Help Ensure Happy Holidays; Don't Fall Victim to Package Thieves," Buffalo News, p. A.1., Dec. 8, 2012. (Year: 2012).*

Machine translation of Lee, Korean application publication 10-2012-0138499, translation dated Dec. 26, 2019. (Year: 2019).*

* cited by examiner

«SIMPLE AND EASY METHOD FOR SECURELY OUTPUTTING ELECTRONIC DELIVERY WAYBILL, AND RECORDING MEDIUM

TECHNICAL FIELD

The present invention relates to a method and system for easily outputting a secure electronic delivery waybill. More specifically, the present invention relates to a method and system for conveniently outputting a delivery waybill in a subordinate product supplier system of a primary product supplier system of an online shopping mall without storing the personal information about a recipient and allowing the personal information about the recipient to be checked only on the mobile terminal of a delivery man without printing personal information on a paper delivery waybill, and a simple secure electronic waybill server system therefor.

BACKGROUND ART

In modern society, as the online shopping market has rapidly grown, a risk of the order information about a customer, particularly, the personal information of the customer, being leaked by a service provider who is provided with various kinds of information related to the customer from an online seller such as a home shopping mall or online shopping mall to handle delivery of a product ordered by the customer has increased significantly.

In addition, as personal information protection-related laws to protect personal information such as personal information about customers are reinforced, the responsibilities of online sellers as well as service providers responsible for a delivery service are increasing.

In order to address these issues, technologies enabling the delivery service to be handled without personal information about the customers being stored in processing systems owned by multiple service providers responsible for the delivery service have been developed.

Figure 1:
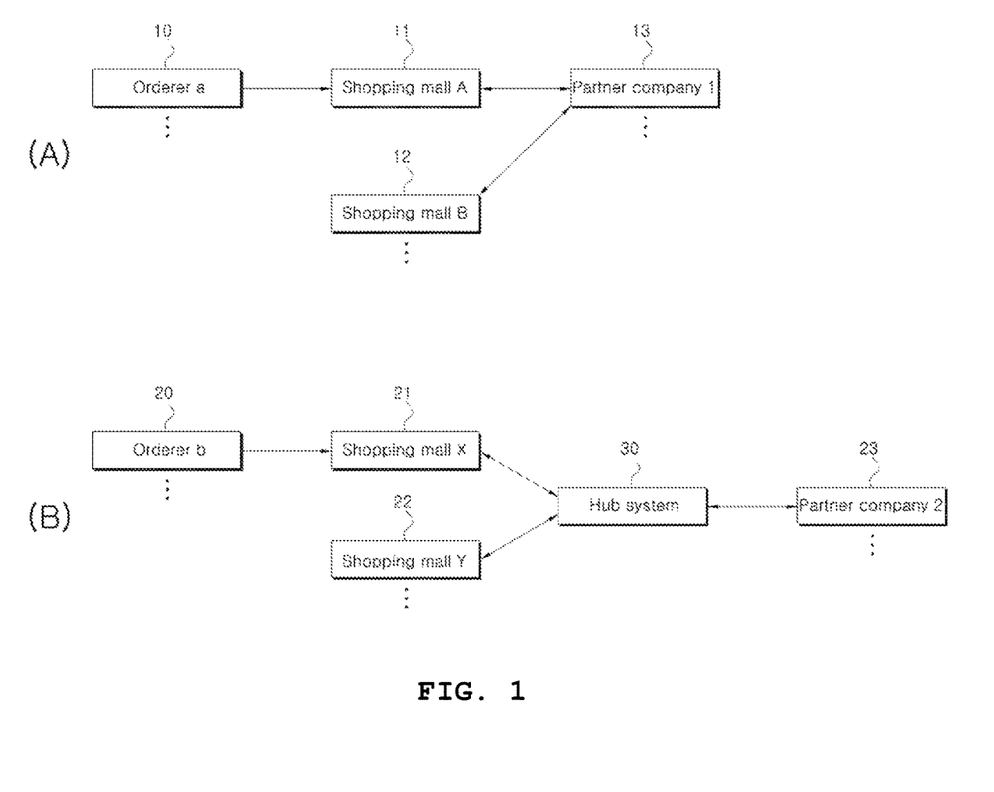
FIG. 1 is a schematic diagram illustrating output of a delivery waybill through a conventional online shopping mall.

Such technologies can be applied in various manners. For example, as schematically shown in FIG. 1, individual Internet shopping malls A, B (11, 12) can build their own secure delivery waybill output systems for order information about an orderer a (10), who is a customer, and a partner company 1 (13), which is a provider responsible for delivery work, can access each corresponding output system and output a secure delivery waybill (see FIG. 1(A)). Second, a separate independent hub system 30 for receiving personal information according to the order information about an orderer b (20), who is a customer, from a plurality of Internet shopping malls X, Y (21, 22) and outputting a delivery waybill can be constructed such that a partner company 2 (23), who is a provider responsible for delivery, can access the hub system and output the secure delivery waybill (see FIG. 1(B)).

However, in the case of the aforementioned two methods, when a secondary or lower-level vendor of the shopping mall handles the operation, the upper-level (secondary to N−1-th-level) product suppliers should sequentially assign a right to access the Internet shopping mall system or the secure delivery waybill hub system to the lower-level (tertiary to N-ary) product suppliers. In addition, if there is no account needed for a higher-level product supplier of the corresponding lower-level product supplier to access the electronic delivery waybill system, the lower-level product supplier cannot output the delivery waybill. Further, in both of the aforementioned methods, the personal information about the recipient is printed on a paper delivery waybill, and accordingly there is always a risk of leakage of the printed personal information.

Therefore, there is a need for a method for enabling the third-level to N-ary subordinate product suppliers to output a delivery waybill using subordinate product supplier access accounts registered with the electronic delivery waybill system by the primary product supplier, even if there are no accounts with which the upper-level (second to N−1-th level) product suppliers of the third-level to N-ary subordinate product suppliers can access the electronic delivery waybill system. In addition, there is a need for a method for providing a delivery service without printing personal information about the recipient on a paper delivery waybill.

DISCLOSURE

Technical Problem

Therefore, the present invention has been made in view of the above problems, and it is an object of the present invention to provide a method for conveniently outputting a secure delivery waybill which enables secure transaction based on a secure waybill output technique for preventing a seller such as an online shopping mall from leaking personal information such as personal information about a recipient, allows all the service providers of various levels responsible for the delivery service to conveniently perform the task of outputting the delivery waybill without storing the personal information about the recipient, and eliminates the need for printing the personal information about the recipient on a paper delivery waybill, and a recording medium on which a program for executing the method is recorded.

Technical Solution

The present invention devised to solve the problem above includes:

a step (S1001) of a customer inputting order information including personal information about the customer in an online shopping mall system through a customer terminal;

a step (S1002) of the online shopping mall system transmitting the order information including the personal information about the customer to an electronic delivery waybill agent system;

a step (S1003) of one of primary to N-ary product supplier systems acquiring the order information without the personal information;

a step (S1004) of the primary product supplier system registering an access account of at least one online shopping mall system thereof and an access account of subordinate product supplier systems thereof the electronic delivery waybill server system;

a step (S1005) of one of the primary to N-ary product supplier systems registering an access account of a delivery service company system with the electronic delivery waybill server system;

a delivery information generation step (S1006) of one of the primary to N-ary product supplier systems generating delivery information using the acquired order information, the delivery information containing information on at least one seller including an access account of the primary product supplier system;

a delivery information provision step (S1007) of one of the primary to N-ary product supplier systems providing the generated delivery information to the electronic delivery waybill server system;

a delivery waybill output request step (S1008) of one of the primary to N-ary product supplier systems making a request to the electronic delivery server system for output of a delivery waybill corresponding to the delivery information;

a delivery service transport information reception step (S1009) of the electronic delivery server system receiving delivery service transport information from the delivery service company system;

a step (S1010) of the electronic delivery waybill server system combining the delivery information received from one of the primary to N-ary product supplier systems and the delivery service transport information received from the delivery service company system and generating delivery waybill combination information that does not include the personal information about the customer;

a step (S1011) of the electronic delivery waybill server system transmitting the delivery waybill combination information and the delivery service company account information to the electronic delivery waybill agent system;

a step (S1012) of the electronic delivery waybill agent system generating delivery waybill output information by combining the delivery waybill combination information transmitted from the electronic delivery waybill server system with the personal information about the customer corresponding to the delivery waybill combination information;

a step (S1013) of the electronic delivery waybill agent system generating delivery request information by combining the delivery combination information transmitted from the electronic delivery waybill server system, the personal information about the customer corresponding to the delivery waybill combination information, and the delivery service company account information;

a step (S1014) of the electronic delivery waybill agent system transmitting the delivery request information to the delivery service company system; and a step (S1015) of the electronic delivery waybill agent system transmitting the delivery waybill output information to an output unit of one of the primary to N-ary product supplier systems.

Advantageous Effects

According to embodiments of the present invention, a subordinate product supplier system of a primary product supplier system for an online shopping mall may easily output a delivery waybill without storing personal information about a recipient.

Specifically, the primary product supplier of the online shopping mall may register all the subordinate product suppliers (the secondary to N-ary product suppliers) thereof at the same level, and thus all the subordinate product suppliers may print out a delivery waybill by accessing an electronic delivery waybill system using an account assigned thereto by the primary product supplier even when upper-level product suppliers do not use the electronic delivery waybill system. For example, even if the secondary to N-1-th-level product suppliers, which are subordinate product suppliers of the primary product supplier of the online shopping mall, are not subscribed to the electronic waybill output system, the N-ary product supplier may be allowed to access the system using an account assigned thereto by the primary product supplier and output the delivery waybill.

Further, by allowing electronic inquiry of delivery waybill output information through the mobile terminal of a delivery man even without printing the delivery waybill output information on the paper delivery waybill, personal information may be protected more safely.

BEST MODE

Hereinafter, exemplary embodiments of the present invention will be described in detail with reference to the accompanying drawings so that those skilled in the art can easily implement the present invention.

The present invention may be embodied in many different forms and is not limited to the embodiments described herein. In order to clearly explain the embodiments of the present invention, in the drawings, parts not related to the description are omitted. Like reference numerals are assigned to like parts throughout the specification.

Figure 2:
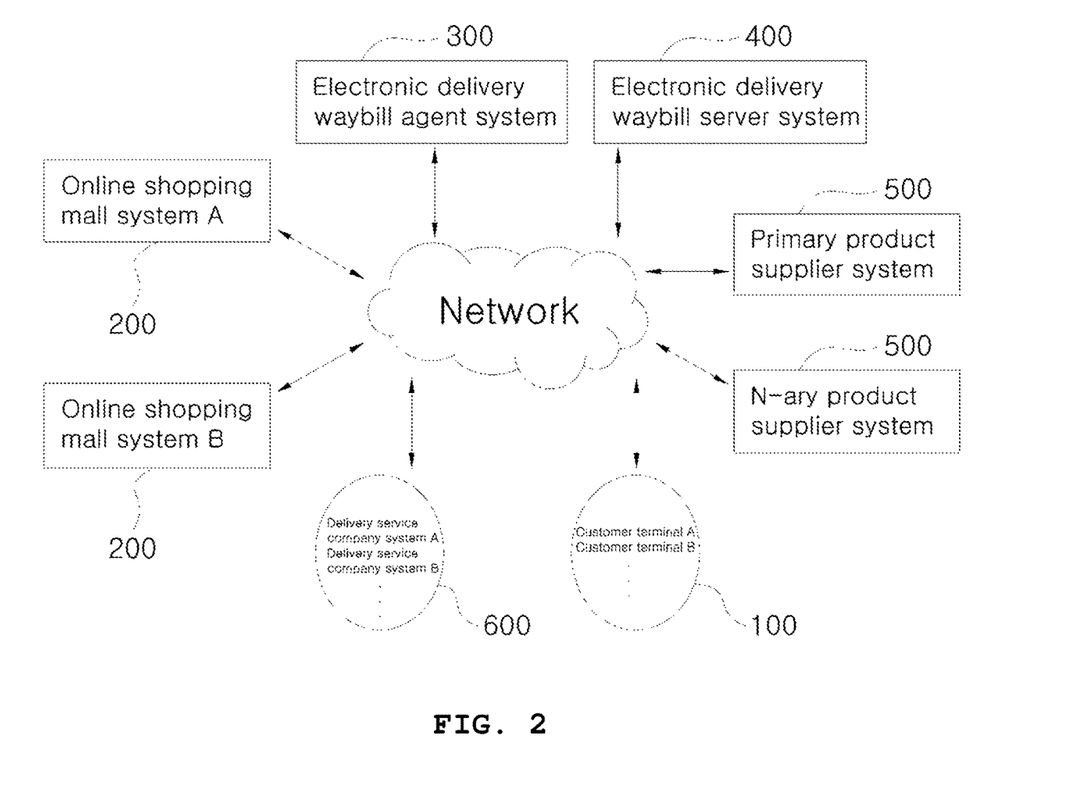
FIG. 2 is a schematic diagram of a simple secure electronic delivery waybill output system according to an embodiment of the present invention.

FIG. 2 is a schematic diagram of subjects participating in the process of ordering and delivery to which a method for outputting a simple secure electronic delivery waybill according to an embodiment of the present invention is applied, wherein the subjects include a customer terminal 100, an online shopping mall system 200, an electronic delivery waybill agent system 300, an electronic delivery waybill server system 400, primary to N-ary product supplier systems 500, and a delivery service company system 600.

A customer's order, output of a corresponding delivery waybill and delivery based on the present invention in a simple secure electronic delivery waybill output system shown in FIG. 2 will be briefly described below.

A customer accesses an online shopping mall system through a terminal of the customer and inputs order information including personal information.

The online shopping mall system transmits the acquired order information including the personal information to an electronic delivery waybill agent system.

Thereafter, the online shopping mall system provides a product supplier system with the order information except the personal information, and the product suppliers sequentially provide the order information to the systems of the subordinate product suppliers (secondary to N-ary suppliers). That is, the primary product supplier provides the information to the secondary product supplier system, the secondary product supplier provides the information to the tertiary supplier system, and the N-1-ary product supplier provides the information to the N-ary product supplier system.

The primary product supplier system registers the access account of at least one online shopping mall system thereof and the access accounts of the subordinate product suppliers (secondary to N-ary product suppliers) with the electronic delivery waybill server system.

The subordinate product supplier systems (secondary to N-ary product supplier systems) register the account of a delivery service company system managed thereby with the electronic delivery waybill server system.

Upon acquiring the order information that does not include the personal information from the electronic delivery waybill agent system, the subordinate product supplier system generates delivery information.

Here, the delivery information may include a name of the Internet shopping mall, which is an online seller, or the like, a customer order number of the Internet shopping mall, which is an online seller, or the like, an account of a subordinate product supplier system registered by the primary product supplier system, an expected date of collection of the ordered product, the product name of the ordered product, the quantity of the ordered product, the price of the ordered product, the quantity of the box for packing the ordered product, the type of box, the delivery fee, and a delivery message.

Upon transmitting the generated delivery information to the electronic delivery waybill server system, output of the delivery waybill is requested.

The electronic delivery waybill server system receives delivery service transport information from the delivery service company system, and then combines the delivery service transport information with the delivery information transmitted from the subordinate product supplier system to generate delivery waybill combination information.

The electronic delivery waybill server system transmits the generated delivery waybill combination information and the delivery service company account information to the electronic delivery waybill agent system.

The electronic delivery waybill agent system generates delivery waybill output information by combining the personal information on the customer with the acquired delivery waybill combination information.

In addition, the electronic delivery waybill agent system generates delivery request information by combining the customer personal information with the acquired delivery waybill combination information and delivery service company account information.

The electronic delivery waybill agent system transmits the generated delivery waybill output information to an output unit of the subordinate product supplier system, and transmits the generated delivery request information to the delivery service company system.

The subordinate product supplier system outputs a delivery waybill through the output unit and attaches the same to a product to be delivered, and then a delivery person performs the delivery service after receiving the product to be delivered.

The network referred to in the present invention may be various types of interfaces using, for example, wired Internet, wireless Internet, a satellite network, a wired telephone network, a wireless telephone network, a mobile phone network, and a broadcast network for terrestrial broadcasting, satellite broadcasting, cable broadcasting, or the like.

As discussed above, according to the present invention, the subordinate product supplier system of the primary product supplier system of an online shopping mall may easily output a delivery waybill without storing recipient personal information.

That is, in registering subordinate product suppliers, the primary product supplier of an online shopping mall may register secondary to N-ary product suppliers, which are subordinate product suppliers of the primary product supplier, at the same level as the level thereof, and any of the subordinate product suppliers may be allowed to access the secure delivery waybill server system using the account assigned to the primary product supplier by the online shopping mall to output a delivery waybill.

Figure 3:
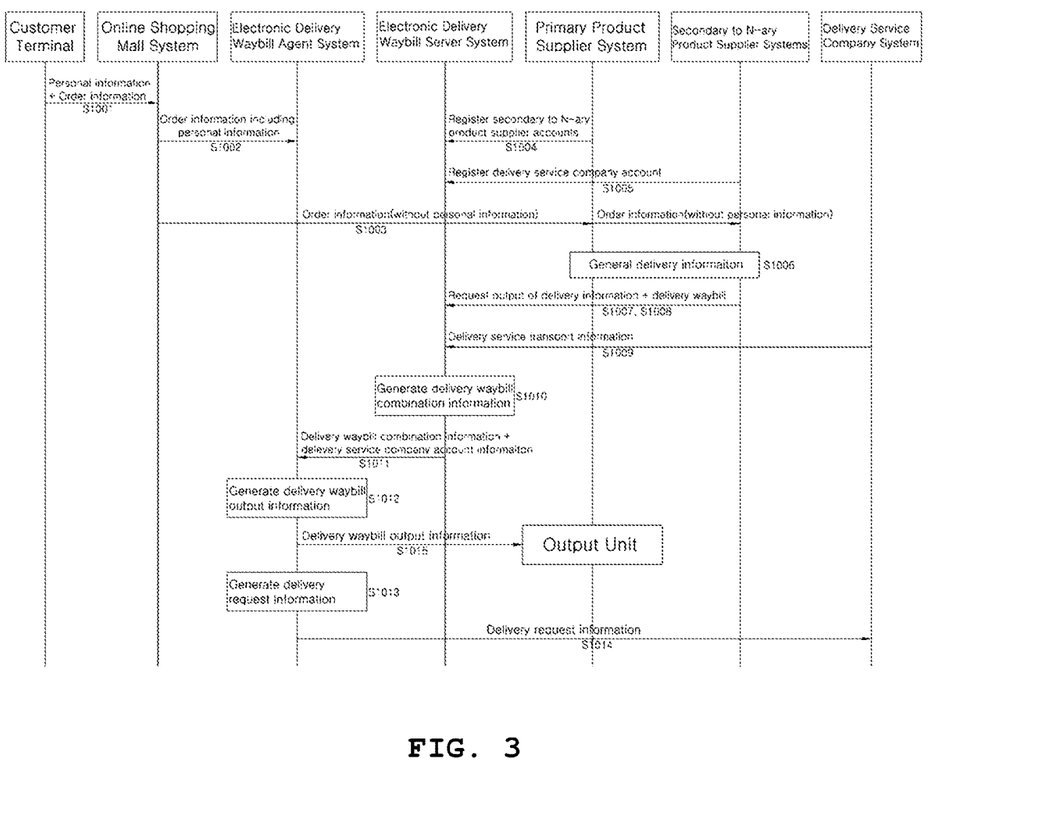
FIG. 3 is a flowchart illustrating outputting a simple secure electronic delivery waybill according to an embodiment of the present invention.

FIG. 3 illustrates an overall flow of a simple method for outputting a secure electronic delivery waybill, which is an embodiment of the present invention. The method for outputting a simple secure electronic delivery waybill includes:

a step of inputting, by a customer, order information including personal information about the customer to an online shopping mall system through a customer terminal;

a step of transmitting, by the online shopping mall system, the order information including the personal information about the customer to an electronic delivery waybill agent system;

a step of registering, by a primary product supplier system, an access account of at least one online shopping mall system thereof and access accounts of subordinate product supplier systems thereof with the electronic delivery waybill server system;

a step of registering, by one of the primary to N-ary product supplier systems, a delivery service company system and an access account of the delivery service company system with the electronic delivery waybill server system;

a step of acquiring, by one of the primary to N-ary product supplier systems, the other information without the personal information;

a delivery information generation step of generating delivery information using the order information by one of the primary to N-ary product supplier systems, the delivery information containing information on at least one seller including an account of the primary product supplier system;

a delivery information provision step of providing, by one of the primary to N-ary product supplier systems, the generated delivery information to the electronic delivery waybill server system;

a delivery waybill output request step of making, by one of the primary to N-ary product supplier systems, a request to the electronic delivery server system for output of a delivery waybill corresponding to the delivery information;

a step of receiving delivery service transport information from the delivery service company system by the electronic delivery waybill server system;

a step of combining, by the electronic delivery waybill server system, the delivery information received from one of the primary to N-ary product supplier systems and the delivery service transport information received from the delivery service company system and generating delivery waybill combination information that does not include the personal information about the customer;

a step of transmitting, by the electronic delivery waybill server system, the delivery waybill combination information and the delivery service company account information to the electronic delivery waybill agent system;

a step of generating, by the electronic delivery waybill agent system, delivery waybill output information by combining the delivery waybill combination information transmitted from the electronic delivery waybill server system with the personal information about the customer corresponding to the delivery waybill combination information;

a step of generating, by the electronic delivery waybill agent system, delivery request information by combining the delivery combination information transmitted from the electronic delivery waybill server system, the personal information about the customer corresponding to the delivery waybill combination information, and the delivery service company account information;

a step of transmitting, by the electronic delivery waybill agent system, the delivery request information to the delivery service company system; and a step of transmitting, by the electronic delivery waybill agent system, the delivery waybill output information to an output unit of one of the primary to N-ary product supplier systems.

A method for outputting a simple secure electronic delivery waybill according to an embodiment of the present invention will be described in detail with reference to FIG. 3.

In this specification, online shopping means an action of a customer purchasing a product online.

Online shopping may be, for example, Internet shopping in which a customer visits a shopping mall established on the Internet using a customer terminal such as a computer, or home shopping in which a customer purchases a product using a home shopping broadcast. Online shopping may be referred to as Internet shopping, home shopping, cyber shopping, electronic shopping, open mall, electronic commerce, or the like.

First, the customer accesses an online shopping mall system over a network through his or her own customer terminal, and then enters order information including personal information about the customer (S1001).

The customer terminal may be a common personal computer, a PDA, a laptop computer, a tablet device, a general telephone, a mobile phone, a smartphone, or a smart TV which is possessed by the customer, or various other information processing devices or portable devices capable of transmitting and receiving images, texts, data, information, and the like over a network.

In an embodiment of the present invention, only the online shopping mall system may be allowed to retain the personal information about the customer, which is necessarily involved in delivery information processing, in particular, the personal information about a recipient to receive an ordered product and transmission of the personal information to the electronic delivery waybill server system may be restricted, thereby enhancing security of the personal information. The personal information on the orderer in the personal information about the customer may be processed in the same way.

To this end, the online shopping mall system may have an electronic delivery waybill agent system for secure processing of personal information in delivering an ordered product based on online commerce. In addition, the electronic delivery waybill agent system may be configured in any one of the online shopping mall system, the delivery service company system, and the electronic delivery waybill server system.

Accordingly, each online shopping mall system may transmit order information including personal information about the customer to the electronic delivery waybill agent system (S1002).

Then, the electronic delivery waybill agent system may acquire recipient personal information requiring maintenance of security from the order information of the customer or the personal information about the customer. The personal information about the customer, particularly the acquired recipient personal information may be separately maintained and managed by the electronic delivery waybill agent system, and will be provided in generating delivery waybill output information and delivery request information, which will be described later.

Next, the online shopping mall system generates order information that does not include the personal information about the customer, particularly the recipient personal information and provides the same to a product supplier system (S1003).

The product supplier system provided with the order information without the personal information may be a primary product supplier system or secondary to N-ary product supplier systems which are subordinate product supplier systems of the primary product supplier system.

In the present invention, the product supplier system includes the primary to N-ary product supplier systems.

The primary product supplier system refers to the top-level product supplier system, and the secondary to N-ary product supplier systems refer to the lower-level product supplier systems subordinate to the primary product supplier system.

The product supplier system is a system for processing various data and information retained by a product supplier that provides products to various online shopping malls. The product supplier system may be a personal computer, a laptop computer, a tablet device, a general telephone, a mobile phone, a smartphone, a smart TV, or various other information processing devices or portable devices capable of transmitting and receiving images, texts, data, information, and the like over a network.

Here, the product supplier may correspond to various manufacturers, makers and vendors who provide products for online sellers such as Internet shopping malls, various sellers who have made inroads into open markets, and other online sellers who make a deal with one online seller.

The primary product supplier system registers an access account assigned by an online shopping mall and the access accounts of the subordinate product supplier systems thereof (secondary to N-ary product supplier systems) with the electronic delivery waybill server system to output a secure electronic waybill (S1004).

The primary product supplier system collectively registers the subordinate product supplier systems thereof to register the secondary to N-ary product supplier systems which are subordinate product supplier systems of the primary product supplier system at the same level as the primary product supplier system to allow all the secondary to N-ary product supplier systems which are subordinate product supplier systems of the primary product supplier system to access the secure delivery waybill agent system using the access account assigned to the primary product supplier by the online shopping mall regardless of the levels of the subordinate product supplier systems and the status of use of the electronic delivery waybill systems of the higher product suppliers.

Thereafter, one of the primary to N-ary product supplier systems registers a delivery service company system it manages and an access account of the delivery service company system with the electronic delivery waybill server system (S1005).

One of the primary to N-ary product supplier systems that received the order information without the personal information from the online shopping mall system generates delivery information based on the order information without the personal information (S1006).

Here, the delivery information may include a name of the Internet shopping mall, which is an online seller, or the like, a customer order number of the Internet shopping mall, which is an online seller, or the like, an account of a subordinate product supplier system registered by the primary product supplier system, an expected date of gathering of the ordered product, the product name of the ordered product, the quantity of the ordered product, the price of the ordered product, the quantity of the box for packing the ordered product, the type of box, a delivery fee, and a delivery message.

One of the primary to N-ary product supplier systems transmits the generated delivery information to the electronic delivery waybill server system (S1007), and requests output of a delivery waybill corresponding to the delivery information (S1008).

The delivery waybill output request is intended for execution of a procedure for marking the personal information about the customer, particularly the recipient personal information on the delivery waybill since the delivery information does not include the personal information about the customer, particularly the recipient personal information, and thus delivery to a destination desired by the customer cannot be conducted based on the delivery information alone.

After receiving the delivery service transport information from the delivery service company system (S1009), the electronic delivery waybill server system combines the delivery information provided from one of the primary to N-ary product supplier systems with the delivery service transport information received from the delivery service company system and generates delivery waybill combination information that does not include the personal information about the customer (S1010).

The delivery waybill combination information may include the product name of the ordered product, the quantity of the product, the price, the delivery waybill number, the delivery fee, a delivery message, a collection place code, a collection place name, the collection date, a destination terminal code, a destination terminal name, an abbreviation of the shipping address, and delivery waybill form information.

The electronic delivery waybill server system transmits the generated delivery waybill combination information and the delivery service company account information to the electronic delivery waybill agent system (S1011).

The electronic delivery waybill agent system generates delivery waybill output information by combining the delivery waybill combination information transmitted from the electronic delivery waybill server system and the personal information about the customer corresponding to the delivery waybill combination information (S1012).

At this time, the electronic delivery waybill agent system uses the personal information about the customer in generating the delivery waybill output information since it has received the personal information about the customer from the online shopping mall system (refer to step S1002).

As described above, since the personal information about the customer that can be marked on the delivery waybill, particularly the recipient personal information, is finally included in the delivery waybill output information, the security delivery waybill agent system can maintain security.

In addition, the electronic delivery waybill agent system generates delivery request information by combining the delivery waybill combination information transmitted from the electronic delivery waybill server system and the personal information about the customer corresponding to the delivery waybill combination information with the delivery service company account information (S1013).

The delivery waybill output information may include the name of the recipient, the telephone number of the recipient, the address of the recipient, the name of the ordered product, the quantity of the product, the price, the delivery waybill number, the delivery fee, a delivery message, a collection place code, a collection place name, the collection date, a destination terminal code, a destination terminal name, an abbreviation of the shipping address, and delivery waybill form information.

Thereafter, the electronic delivery waybill agent system transmits the delivery request information to the delivery service company system (S1014).

The delivery request information may be utilized by the delivery service company to collect the delivery item from the product supplier and perform the delivery service. The delivery request information may be transmitted to the delivery service company system directly or via the electronic delivery waybill server system.

In addition, the electronic delivery waybill agent system transmits the delivery waybill output information to an output unit of one of the primary to N-ary product supplier systems (S1015).

In this operation, the electronic delivery waybill agent system transmits the delivery waybill output information to the output unit of one of the primary to N-ary product supplier systems directly or via the electronic delivery waybill server system.

Thereafter, the product supplier system attaches the delivery waybill output as a document to the corresponding ordered product, and the delivery service company collects the product to provide the delivery service.

Here, it should be noted that the delivery waybill output information is directly transmitted to the output unit of the product supplier system.

In this case, the delivery waybill output information including the personal information is not stored in the product supplier system, but is merely output to the document sheet or the monitor. Therefore, a risk of leakage of the personal information about the customer caused by hacking, which may occur when the information is stored and managed in the system, may be eliminated.

Thereafter, the product supplier attaches the delivery waybill output in the form of a document to the ordered product, and then the delivery service for the product is executed by the delivery service company.

Further, the electronic delivery waybill agent system may transmit the delivery waybill output information to the output unit of one of the primary to N-ary product supplier systems, excluding the personal information about the customer. In this case, the electronic delivery waybill agent system transmits the personal information about the customer excluded from the delivery waybill output information to the terminal of a delivery man.

That is, in the above case, the personal information about the customer is not included in the delivery waybill output information transmitted to the output unit of the product supplier system, and accordingly the personal information about the customer is not included in the output delivery waybill. However, in order to provide a delivery service, the personal information about the customer is needed and is thus transmitted to the terminal of a delivery man responsible for the delivery service, and the delivery man performs the delivery service, referring to the personal information about the customer transmitted to the terminal.

The embodiments of the present invention described above can be implemented not only through a system and method but also through a computer program for realizing functions corresponding to the configurations of the embodiments of the present invention or a recording medium on which the computer program is recorded.

Although the preferred embodiments of the present invention have been disclosed for illustrative purposes, those skilled in the art will appreciate that various modifications, additions and substitutions are possible, without departing from the scope and spirit of the invention. The scope of the invention will be determined by the appended claims and their equivalents.

100: Customer terminal
200: Online shopping mall system
300: Electronic waybill agent system
400: Electronic waybill server system
500: Primary to N-ary product supplier systems
600: Delivery service system

What is claimed is:

1. A method for easily and securely outputting a secure electronic delivery waybill through a secure electronic delivery waybill server system based on order information about a customer, the method comprising:
a step (S1001) of a customer inputting order information including personal information about the customer in an online shopping mall system through a customer terminal;
a step (S1002) of the online shopping mall system transmitting the order information including the personal information about the customer to an electronic delivery waybill agent system;
a step (S1003) of one of primary to N-ary product supplier systems acquiring the order information without the personal information;
a step (S1004) of the primary product supplier system registering an access account of at least one online shopping mall system associated with the primary product supplier system and an access account of subordinate product supplier systems associated with the electronic delivery waybill server system;
a step (S1005) of one of the primary to N-ary product supplier systems registering an access account of a delivery service company system with the electronic delivery waybill server system;
a delivery information generation step (S1006) of one of the primary to N-ary product supplier systems generating delivery information using the acquired order information, the delivery information containing information on at least one seller including an access account of the primary product supplier system;
a delivery information provision step (S1007) of one of the primary to N-ary product supplier systems providing the generated delivery information to the electronic delivery waybill server system;
a delivery waybill output request step (S1008) of one of the primary to N-ary product supplier systems making a request to the electronic delivery waybill server system for output of a delivery waybill corresponding to the delivery information;
a delivery service transport information reception step (S1009) of the electronic delivery waybill server system receiving delivery service transport information from the delivery service company system;
a step (S1010) of the electronic delivery waybill server system combining the delivery information received from one of the primary to N-ary product supplier systems and the delivery service transport information received from the delivery service company system and generating delivery waybill combination information that does not include the personal information about the customer;
a step (S1011) of the electronic delivery waybill server system transmitting the delivery waybill combination information and the delivery service company account information to the electronic delivery waybill agent system;
a step (S1012) of the electronic delivery waybill agent system generating delivery waybill output information by combining the delivery waybill combination information transmitted from the electronic delivery waybill server system with the personal information about the customer corresponding to the delivery waybill combination information;
a step (S1013) of the electronic delivery waybill agent system generating delivery request information by combining the delivery combination information transmitted from the electronic delivery waybill server system, the personal information about the customer corresponding to the delivery waybill combination information, and the delivery service company account information;
a step (S1014) of the electronic delivery waybill agent system transmitting the delivery request information to the delivery service company system; and
a step (S1015) of the electronic delivery waybill agent system transmitting the delivery waybill output information to an output unit of one of the primary to N-ary product supplier systems.

2. The method according to claim 1, wherein the electronic delivery waybill agent system is configured in one of an online shopping mall system, the delivery service company system, and the electronic delivery waybill server system.

3. The method according to claim 1, wherein, in the step of the delivery waybill agent system transmitting the delivery request information to the delivery service company system,
the delivery request information is transmitted to the delivery service company system via the electronic delivery waybill server system.

4. The method according to claim 3, wherein, in the step of the electronic delivery waybill agent system transmitting the delivery request information to the delivery service company system, the delivery request information is transmitted with the personal information about the customer excluded therefrom.

5. The method according to claim 1, wherein, in the step of the electronic delivery waybill agent system transmitting the delivery waybill output information to the output unit of one of the primary to N-ary product supplier systems,
the delivery waybill output information is transmitted to one of the primary to N-ary product supplier systems via the electronic delivery waybill server system.

6. The method according to claim 5, wherein, in the step of the electronic delivery waybill agent system transmitting the delivery waybill output information to the output unit of one of the primary to N-ary product supplier systems,
the delivery waybill output information is transmitted with the personal information about the customer excluded therefrom.

7. The method according to claim 1, wherein, in the step of the electronic delivery waybill agent system transmitting the delivery waybill output information to the output unit of one of the primary to N-ary product supplier systems,
the delivery waybill output information is transmitted with the personal information about the customer excluded therefrom.

8. The method according to 7, wherein the personal information about the customer excluded from the delivery waybill output information is transmitted to a terminal of a delivery man.

9. The method according to claim 1, wherein, in the step of the electronic delivery waybill agent system transmitting the delivery request information to the delivery service company system, the delivery request information is transmitted with the personal information about the customer excluded therefrom.

10. The method according to claim 9, wherein the personal information about the customer excluded from the delivery request information is transmitted to a terminal of a delivery man.

* * * * *